United States Patent [19]

Zyner

[11] Patent Number: 5,150,319
[45] Date of Patent: Sep. 22, 1992

[54] CIRCUITRY FOR ROUNDING IN A FLOATING POINT MULTIPLIER

[75] Inventor: Grzegorz B. Zyner, Sunnyvale, Calif.

[73] Assignee: Sun Microsystems, Inc., Mountain View, Calif.

[21] Appl. No.: 695,423

[22] Filed: May 3, 1991

[51] Int. Cl.⁵ .................................. G06F 7/52
[52] U.S. Cl. ..................... 364/745; 364/748
[58] Field of Search .................. 364/745, 748

[56] References Cited

U.S. PATENT DOCUMENTS

| | | | |
|---|---|---|---|
| 4,926,370 | 5/1990 | Brown et al. | 364/748 |
| 4,941,120 | 7/1990 | Brown et al. | 364/748 |
| 4,977,535 | 12/1990 | Birger | 364/748 |
| 5,027,308 | 6/1991 | Sit et al. | 364/748 |

Primary Examiner—David H. Malzahn
Attorney, Agent, or Firm—Blakely Sokoloff Taylor & Zafman

[57] ABSTRACT

A rounding circuit for a binary tree floating point multiplier including apparatus for providing the upper bits of a mantissa presuming that no carry-in has occurred without waiting for the generation of a carry-in from lower order bits, apparatus for providing the upper bits of a mantissa presuming that a carry-in has occurred without waiting for the generation of a carry-in from lower order bits; apparatus for providing a first set of lower order bits for the mantissa based on an actual carry-in from a lower order bit adder and a rounding condition, the first set of lower order bits for the mantissa being chose for no mantissa overflow; apparatus for providing a second set of lower order bits for the mantissa based on an actual carry-in from a lower order bit adder and a rounding condition, the second set of lower order bits for the mantissa being chosen for mantissa overflow; and apparatus for selecting upper order bits and lower order bits for the mantissa based on whether a carry-in propagates past the lower order bits of the mantissa and whether a mantissa overflow has occurred.

5 Claims, 2 Drawing Sheets

Case 1: C51 = 0, rnd + 0 rd_m = man_pr, output of the carry propogate adder is already the correct result.

Case 2: C51 = 1, rnd + 0

| man_pr[105:52] | x.xx_xx00 | x.xx_xx01 | x.xx_xx10 | x.xx_xx11 |
|---|---|---|---|---|
|  | + 1 | + 1 | + 1 | + 1 |
| rd_m | x.xx_xx01 | x.xx_xx10 | x.xx_xx11 | ......00 |

Case 3: C51 = 0, rnd + 1

Same as Case 2.

Case 4: C51 = 1, rnd + 1

| man_pr[105:52] | x.xx_xx00 | x.xx_xx01 | x.xx_xx10 | x.xx_xx11 |
|---|---|---|---|---|
|  | + 10 | + 10 | + 10 | + 10 |
| rd_m | x.xx_xx01 | x.xx_xx11 | ......00 | ......00 |

Case 5: C51 = 0, rnd + 0 rd_m = man_pr, output of the carry propogate adder is already the correct result.

Case 6: C51 = 1, rnd + 0

| man_pr[105:52] | x.xx_xx00 | x.xx_xx01 | x.xx_xx10 | x.xx_xx11 |
|---|---|---|---|---|
|  | + 1 | + 1 | + 1 | + 1 |
| rd_m | x.xx_xx01 | x.xx_xx11 | x.xx_xx11 | ......00 |

Case 7: C51 = 0, rnd + 1 (same as case 4)

| man_pr[105:52] | x.xx_xx00 | x.xx_xx01 | x.xx_xx10 | x.xx_xx11 |
|---|---|---|---|---|
|  | + 10 | + 10 | + 10 | + 10 |
| rd_m | x.xx_xx10 | x.xx_xx11 | ......00 | ......00 |

Case 8: C51 = 1, rnd + 1

| man_pr[105:52] | x.xx_xx00 | x.xx_xx01 | x.xx_xx10 | x.xx_xx11 |
|---|---|---|---|---|
|  | + 11 | + 11 | + 11 | + 11 |
| rd_m | x.xx_xx11 | ......00 | ......01 | ......11 |

*Figure 1*

CIRCUITRY FOR ROUNDING IN A FLOATING POINT MULTIPLIER

BACKGROUND OF THE INVENTION

1. Field of the Invention

This invention relates to floating point multipliers and, more particularly, to methods and apparatus for increasing the speed of rounding in such multipliers.

2. History of the Prior Art

Various arrangements for providing fast multiplying circuits for use in computers have been proposed. Basically, the product of two n-bit binary operands is realized by determining a number of partial products each of which is offset by one bit to the left from the preceding partial product. The partial products are then summed to reach a result. In order to rapidly sum the partial products, binary tree arrangements have been suggested in which the individual partial products are grouped in pairs and the groups summed in parallel by carry-save adders. The results of the summations of these partial products are again grouped in pairs and the groups summed in parallel in the same manner by additional carry-save adders. This process continues until the last two partial products are summed to produce a product. *High Speed Multiplier Using a Redundant Binary Adder Tree*, Harata et al, IEEE Journal of Solid-State Circuits, Vol. SC-22, No. 1, February 1987, describes such a circuit. A carry propagate adder may used to add the sums and the carries of the last two partial products from the preceding stages of the binary tree multiplier.

These circuits may be used in either integer multiplication or in generating the mantissa in floating point multiplication. When the multiplier circuit is used in a floating point multiplier arrangement, it typically produces a result which has twice as many bits as the machine handles so it is often necessary for the result to be rounded. For example, the standard for double precision binary numbers requires fifty-three bits. A product of two fifty-three bit binary numbers is one hundred and six bits long. However, a double precision result uses only the upper fifty-four bits of this product with the most significant bit indicating overflow. The lower fifty-three bits are necessary only to determine whether a carry is generated from the lower bits, whether rounding is required, and the precise rounding value.

In order to accomplish rounding of the product, it is first necessary to normalize the mantissa. In binary multiplication using two normalized operands, this requires at most a shift to the right of the mantissa by one bit so that only a single significant bit lies to the left of the binary point and an increase in the power of the exponent. Until the mantissa is normalized, the bit position at which rounding is accomplished is not known. Even though the lower order bits of the product are used only to generate a carry and to determine rounding, the generation of the carry result for the lower order bits is required before the carry propagate adder for the upper order bits can begin operation. Since a mantissa is derived and can be normalized only after the carry propagate addition of the upper order bits is complete, the entire operation must typically wait for the low order carry to be generated and for that carry bit to propagate across the upper bits. Thus, the carry from the lower order bits is in the critical path.

It is typical in such multipliers once normalization has occurred to generate the rounding condition, and, if necessary, add a one to the normalized mantissa at the least significant bit to produce the rounded result. This approach uses a carry propagate adder at the output of the multiplier tree and an incrementer at the output of the adder to produce the rounding. A common approach to speed the operation of the arrangement is to use two rounding circuits in parallel. One circuit presumes the mantissa will overflow while the other assumes it will not. The correct result is selected once the most significant bit of the unrounded mantissa is available.

In any case, in the typical prior art floating point multiplier everything awaits the result of the carry propagation of the lower order bits.

SUMMARY OF THE INVENTION

It is, therefore, an object of the present invention to increase the speed with which floating point multiplier circuits may reach a result.

It is another more specific object of the present invention to eliminate a substantial part of the delay in a floating point multiplier circuit caused by the need to await the result of the carry propagation from the lower order bits.

These and other objects of the present invention are realized in a rounding circuit for a floating point multiplier comprising means for providing the upper bits of a mantissa presuming that no carry in has occurred without waiting for the generation of a carry in from lower order bits; means for providing the upper bits of a mantissa presuming that a carry in has occurred without waiting for the generation of a carry in from lower order bits; means for providing a first set of lower order bits for the mantissa based on an actual carry in from a lower order bit adder and a rounding condition, the first set of lower order bits for the mantissa being chosen for no mantissa overflow; means for providing a second set of lower order bits for the mantissa based on an actual carry in from a lower order bit adder and a rounding condition, the second set of lower order bits for the mantissa being chosen for mantissa overflow; and means for selecting upper order bits for the mantissa and lower order bits based on whether a carry in propagates past the lower order bits of the mantissa and whether a mantissa overflow has occurred.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a diagram illustrating the conditions possible as a result of the various overflow, carry-in, and rounding possibilities in a floating point multiplier circuit.

NOTATION AND NOMENCLATURE

Figure 2:
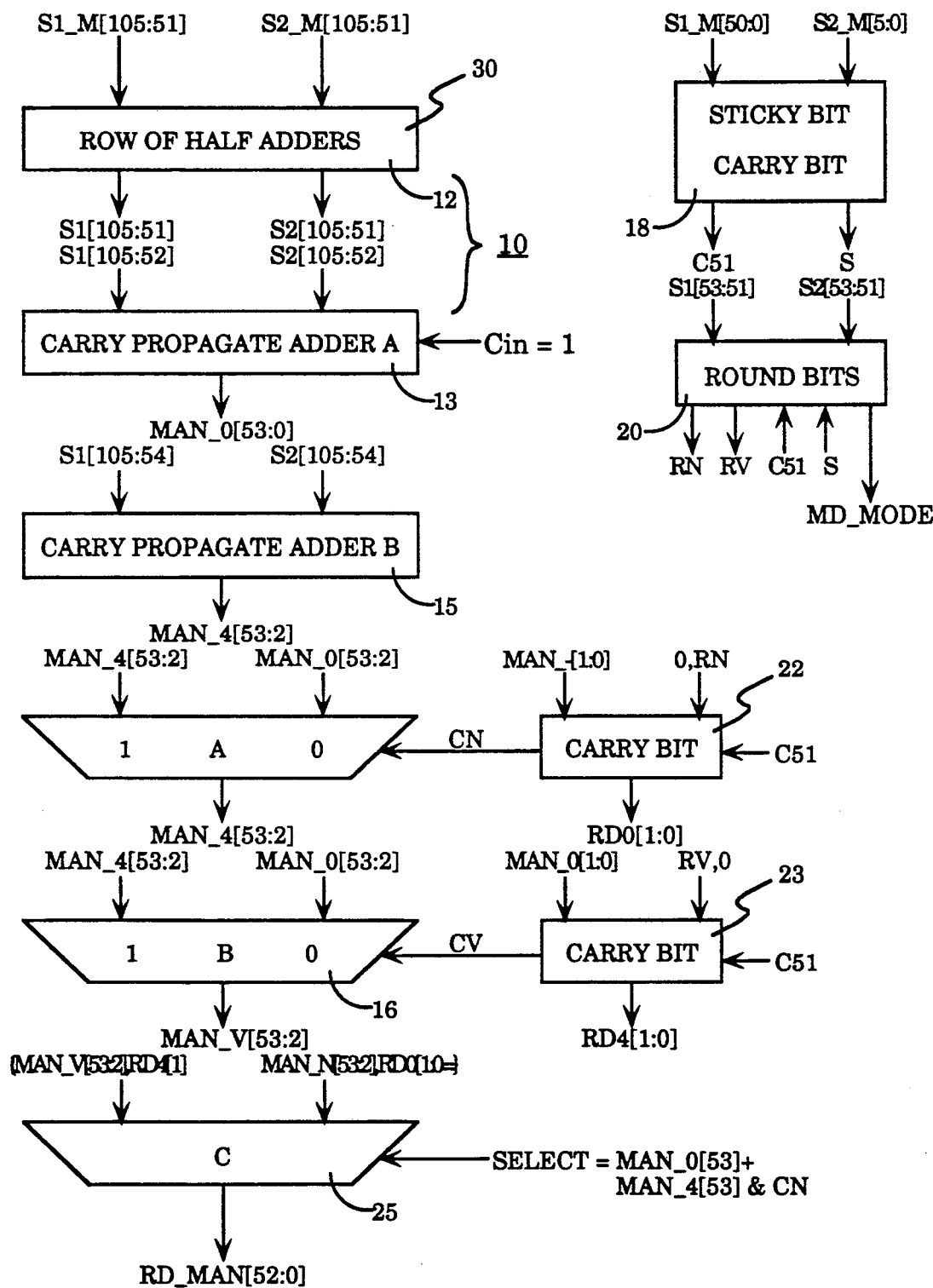
FIG. 2 is a block diagram illustrating a circuit constructed in accordance with the invention.

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

In order to increase the speed at which a floating point multiplier reaches a final result, the present invention removes the generation of the lower order carry bit from the critical path.

To understand the operation by which this may be accomplished, a number of diagrams have been provided in FIG. 1 to illustrate the various conditions of the output of the carry propagate adder used to produce the final product. In each of these cases, this product MAN_PR[05:52] is the output of the carry propagate adder produced by adding the high order bits of the operands (indicated as the two operands S1[105:52] and S2[105:52]) produced by the binary tree arrangement of the multiplier. The first four cases presume that there is no mantissa overflow requiring normalizing while the last four examples presume that there is a mantissa overflow. In each case, the mantissa value is illustrated as the upper value, and the four possible conditions of the two lowest order bits are illustrated below.

In Cases 1 through 4, since there is no mantissa overflow, the mantissa does not have to be normalized (shifted to the right with its exponent increased) so the round bit and the carry bit furnished from the addition of the lower order bits by the carry propagate adder are provided at the same bit position. In Case 1, there is no carry from bit 51 of the lower order bits, and no rounding is required. Consequently, the mantissa $MAN_{13}PR[105:52]$ produced by the carry propagate adder is already correct. In Case 2, a carry bit ($C51=1$) is generated from the lower order bits of the carry propagate adder while no rounding is required so no rounding bit is generated. As may be seen, only in the case where the two lowest order bits of the mantissa $MAN_{13}PR[105:52]$ are both ones does the carry from the lower order bits propagate past the position of bit 54 in the mantissa; this is represented in FIG. 1 by the series of dots to the left in the result of combining the carry and the mantissa. Consequently, only a mantissa $MAN_{13}PR[105:52]$ having ones in the two lowest bit positions can be caused to overflow by the presence of a carry bit C51.

Case 3 (in which there is no carry bit and a round bit is present) is identical to Case 2 since only a single one is added at the lowest bit position of the mantissa. Consequently, in Case 3 only a mantissa $MAN_{13}PR[105:52]$ having ones in the two lowest bit positions can be caused to overflow by the presence of a carry bit C51.

In Case 4, both a carry bit C51 and a round bit are generated from the low order bits. Summing these two bits provides a one to be added in the next to lowest bit position of the mantissa. As may be seen, only mantissa values having a one in the second to lowest bit position will propagate the carry past bit 54 of the mantissa. Again, these are indicated by the dots in the examples to the left of the two lowest order bits in the examples of Case 4.

Cases 5 through 8 presume that there is a mantissa overflow so that the mantissa must be normalized. This normalization moves the bits of the mantissa to the right by one position and has the effect of injecting the rounding bit from the lower order carry propagate adder at the level of bit 53 of the mantissa while the carry bit continues to be injected at bit 52.

Thus, the round bit and the carry bit are provided at two different bit positions. In Case 5, there is no carry from bit 51 of the lower order bits, and no rounding is required. Consequently, the mantissa $MAN_{13}PR[105:52]$ produced by the carry propagate adder is already the correct result whatever the lowest order bits of that mantissa may be. In Case 6, however, a carry bit ($C51=1$) is generated while no rounding bit is generated from the lower order bits of the carry propagate adder. As may be seen, only in the case in which the two lowest order bits of the mantissa $MAN_{13}PR[105:52]$ are both ones does the carry from the lower order bits propagate past the position of bit 54 in the mantissa; again, this is represented in FIG. 1 by the series of dots to the left in the result. Consequently, only a mantissa $MAN_{13}PR[105:52]$ having ones in the two lowest bit positions can be caused to overflow by the presence of a carry bit C51.

Case 7 (in which there is no carry bit and a round bit is present) is identical to Case 4 where a single one is added to the mantissa at the next to lowest bit position. Only a mantissa value $MAN_{13}PR[105:52]$ having a one in the next to lowest bit position can be caused to overflow by the presence of a one in the second to lowest bit position to propagate the carry past bit 54 of the mantissa.

In Case 8 both a carry bit C51 and a round bit are present. Summing these two bits provides ones in both of the lowest bit positions. As may be seen, only with mantissa values having zeroes in both of the lowest bit positions will the carry not propagate past bit 54 of the mantissa. Again, these propagations are indicated by the dots in the examples to the left of the two lowest order bits in the examples of Case 8.

Thus, it will be realized that by generating a pair of mantissas, one in which there is no carry past bit 54 and one in which there is a carry past bit 54, all of the conditions represented in the above cases may be readily produced. These mantissas may be generated without waiting for the carry from the lower bits. These mantissas may be provided to a series of multiplexors the outputs of which are selected by the rounding, low order carry, and overflow actually occurring, so that substantial time may be saved in producing a result from the multiplier.

FIG. 2 is block diagram of circuitry for implementing the present invention. A circuit 10 includes a first carry propagate adder 12 and a second carry propagate adder 13. The first adder 12 receives as input a pair of operands S1[105:52] and S2[105:52] and sums those two values to produce a mantissa value $MAN_{13}0[53:0]$. The adder 12 receives a carry-in of zero from the lower order bits and thus produces a mantissa which assumes that there has been no carry at bit 51. The second adder 13 receives as input a pair of operands S1[105:54] and S2[105:54] and sums those two values to produce a mantissa value $MAN_{13}4[53:2]$. The adder 13 receives a carry-in of one from the lower order bits at the bit 54 level and thus produces a mantissa which assumes that there has been a carry propagated past bit 53.

Thus, these two carry propagate adders produce the mantissa bits from bit 54 through bit 105 presuming that there is no carry-in at bit 52 and that a carry-in has propagated to bit 54. The two lowest order bits of the mantissa from the adder 12 are dropped, and the remaining digits from both adders 12 and 13 are furnished to each of a pair of multiplexors 15 and 16 as the two possible upper order values [53:2] of a final mantissa. Thus, the mantissa values except for the two lowest order bits are immediately available with the completion of the operations by the carry propagate adders 12 and 13 without waiting for the carry resulting from addition of the low order bits of the operands. The values selected at the multiplexors 15 and 16 are determined by additional circuitry of FIG. 2.

During the operation of the adders 12 and 13 to generate the upper order bits of the two possible mantissa values, a combinational logic block 18 sums the lower order bits $S1_{13}M[50:0]$ and $S2\_M[50:0]$ of the two operands and provides as output the carry bit 51 and a sticky bit. These two bits are used to determine the actual rounding and carry required in the upper order bit positions. IEEE standard 754 for binary floating point arithmetic creates a default rounding mode of "round to nearest," and in the case of a tie "round to nearest/even" is chosen. In order to resolve a tie, a "sticky bit" is generated in accordance with the IEEE 754. The sticky bit has the value one when any lower order bit past the guard bit position of either of the two operands is a one; the sticky bit is a zero if no bit is a one.

Not only does the IEEE standard provide for a default mode as indicated, but offers three other modes as well. These are round toward zero, round toward positive infinity, and round toward negative infinity. Each of the rounding values for these rounding modes may be produced when the value of the sticky bit is known.

The three bits [53:51] of each of the operands S1 and S2 which may vary depending on rounding, carry, and overflow are furnished to a three bit adder circuit 20. The circuit 20 also receives the carry C51 and the sticky bit generated from the adder 18 and a signal RND MODE which indicates which of the four rounding modes is desired. The adder 20 adds these signals in a manner depending on the rounding mode and produces an output signal RN and an output signal RV. The signal RN is the rounding value to be used if there is no overflow of the mantissa, while RV is the rounding value to be used if there is a mantissa overflow.

A two bit adder 22 is furnished the RN value in the lowest order bit position. Also furnished to the adder 22 are the two lowest order bits [52:51] (illustrated as MAN_0[1:0]) generated for the mantissa by the carry propagate adder 12 which were dropped in the transfer of the mantissa value to the multiplexors 15 and 16. These values and the value of the carry bit 51 are combined and produce a value RD0[1:0] for the two lowest order bits of a final mantissa. The combination also produces a signal CN. The value of the signal CN signifies whether there is a carry-in to bit 2 of the mantissa in a case in which no overflow of the mantissa is involved. The presence or absence of this signal CN is used to select the output from the multiplexor 15. If a carry is present, the value MAN_4[53:2] produced by the adder 13 which received a carry-in is selected; if no carry is present, the value MAN_0[53:2] produced by the adder 12 with no carry-in is selected. Thus, the signal CN from the adder 22 selects correctly one of the two partial mantissas depending on whether the carry-in is propagated or not to bit 2 of the final mantissa.

In a similar manner, the RV value is furnished to a two bit adder 23 in the next to lowest order bit position concatenated with a one in the lowest order bit position. Also furnished to the adder 23 are the two lowest order bits [52:51] (here shown as MAN_0[1:0]) generated as a mantissa by the carry propagate adder 12 but not transferred to the multiplexors 15 and 16. These values and the value of the carry bit 51 are combined and produce a possible value RD4[1:0] for the two lowest order bits of the mantissa to be used for the case of mantissa overflow. The combination also produces a value CV which signifies whether or not there is a carry-in to bit 2 of the mantissa when an overflow of the mantissa has occurred. The presence or absence of this signal CV is used to select the output from the multiplexor 16. If a carry is present, the value MAN_4[53:2] produced by the adder 13 which received a carry-in is selected; if no carry is present, the value MAN_0[53:2] produced by the adder 12 with no carry-in is selected. Thus, the signal CV from the adder 23 selects correctly the two partial mantissas depending on whether the carry-in is propagated or not to bit 2 of the final mantissa.

Finally, the high order bit values transferred by the multiplexor 15 are concatenated with the two lower order bits from the adder 22 and furnished as one input to a third multiplexor 25. In like manner, the high order bit values transferred by the multiplexor 16 are concatenated with the two lower order bits furnished by the two bit adder 23 and furnished as another input to the third multiplexor 25. The output produced by the multiplexor 25 is controlled by the logical term illustrated to the right of that multiplexor 25. It will be recognized that if an overflow occurs from the mantissa of the adder 12 which has no carry-in, then an overflow must occur from the mantissa of the adder 13 which has a carry-in of one. On the other hand, the reverse is not true; the overflow of the adder 13 may occur because of the carry-in of one while the adder 12 need not have overflowed.

Consequently, if the high order bit produced by the carry propagate adder 12 is a one (indicating mantissa overflow), then the result produced by the value from the multiplexor 16 and the adder 23 are selected. Similarly, if the high order bit produced by the carry propagate adder 13 is a one (indicating mantissa overflow) and there is a carry-in (CN=1) to bit 2 of the final mantissa, then the result produced by the value from the multiplexor 16 and the adder 23 are selected. If neither of these occurs, then the mantissa provided by the multiplexor 15 and the adder 22 is selected.

There is one case in which the circuit of FIG. 2 as it has been explained to this point does produce the correct result. That is a condition in which all of the bits of both operands S1 and S2 immediately to the left of the bit 51 are ones. If a one is added to bit 51, then a carry should be propagated through the stages to the left. This will not occur since the propagation will not be carried out by the adder circuit 13 which sums beginning at bit 54. Thus, a circuit 30 comprising a row of half adders is used to assimilate the initial carry bits if the output of the multiplier tree is a string of all ones immediately to the left of bit 51.

As may be seen by those skilled in the art, the circuit of the present invention allows all but the lowest bits of the possible mantissas to be generated and overflow determined immediately upon the completion of the operation of the carry propagate adder for the high order bits without waiting for the carry from the lower order bits before commencing the operation. The circuit then only need assess the value of the carry-in to bit 51, the sticky bit, and the rounding mode across three bit position to provide the low order bits. Thus, the carry bit C51 need only be propagated over three bit stages rather than across all of the stages of the high order carry propagate adder. The circuit of the present invention thus provides results much more rapidly by essentially eliminating the carry bit provided by the low order carry propagate adder from the critical path.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A rounding circuit for rounding a final mantissa of bits $2n+1:0$ in floating point multiplication by two binary operands bits $n:0$ for a binary tree floating point multiplier, said binary tree floating point multiplier generating said final mantissa by adding in parallel a plurality of pairs of partial products each of bits $2n+1:01$ through a plurality of carry-propagate adder, said rounding circuit comprising:

first adder means for providing bits $n+1:0$ of a first mantissa by summing bits $2n+1:n$ of a first and second partial products presuming that no carry-in has occurred when summing bits $n-1$ of said first and second partial products without waiting for the generation of bits $n-1:0$ of said first and second partial products;

second adder means for providing bits $n+1:2$ of a second mantissa by summing bits $2N+a:n+2$ of said first and second partial products presuming that a second carry-in has occurred when summing bits $n+1$ of said first and second partial products without waiting for the generation of said second carry-in from bits $n+1:0$ of said first and second partial products;

first multiplexor means for providing a first set of bits 1:0 for said final mantissa based on an actual carry-in from summing bits $n-2:0$ of said first and second partial products and a rounding condition, the first set of bits 1:0 for said final mantissa being chosen for no mantissa overflow;

second multiplexor means for providing a second set of bits 1:0 for said final mantissa based on an actual carry-in from summing bits $n-2:0$ of said first and second partial products and a rounding condition, the second set of bits 1:0 for said final mantissa being chosen for mantissa overflow; and third multiplexor means for selecting bits $n+1:2$ and bits 1:0 for said final mantissa based on whether a carry-in propagates past bits 1:0 of the final mantissa and whether a mantissa overflow has occurred.

2. A rounding circuit for a binary tree floating point multiplier as claimed in claim 1 in which said third multiplexor means for selecting bits $n+1:2$ and bits 1:0 for the final mantissa based on whether a carry-in propagates past bits 1:0 of the final mantissa and whether a mantissa overflow has occurred comprises means for assessing the condition of bit $n+1$ of the bits provided by each of the first and second multiplexor means for providing the upper bits of a mantissa.

3. A rounding circuit for a binary tree floating point multiplier as claimed in claim 1 in which said third multiplexor means for selecting bits $n+1:2$ and bits 1:0 for the final mantissa based on whether a carry-in propagates past bits 1:0 of the final mantissa and whether a mantissa overflow has occurred comprises means for detecting whether a carry out is generated by each of said first and second set of bits 1:0 for the final mantissa. said first and second set of bits 1:0 for the final mantissa.

4. A rounding circuit for a binary tree floating point multiplier as claimed in claim 3 in which said third multiplexor means for selecting bits $n+1:2$ and bits 1:0 for the final mantissa based on whether a carry-in propagates past bits 1:0 of the final mantissa and whether a mantissa overflow has occurred comprises means for assessing the condition of bit of the bits provided by each of the first and second multiplexor means for providing the upper bits of a mantissa.

5. A rounding circuit for a binary tree floating point multiplier as claimed in claim 3 in which the first multiplexor means for providing a first set of bits 1:0 for the final mantissa based on an actual carry-in from summing bits $n-2:0$ of said first and second partial products and a rounding condition comprises a third adder for adding bits 1:0 generated by the first adder means for providing the upper bits of a mantissa presuming that no carry-in has occurred, the rounding value generated from bits $n+1:n-1$ of said first and second partial products, and the carry-in from the lower order bits as those values would be added with no mantissa overflow; and in which the second multiplexor means for providing a second set of bits 1:0 for the final mantissa based on an actual carry-in from summing bits $n-2:0$ of said first and second partial products and a rounding condition comprises a fourth adder for adding bits 1:0 generated by the first adder means for providing the upper bits of a mantissa presuming that no carry-in has occurred, the rounding value generated from bits $n+1:n-1$ of said first and second partial products, and the carry-in from bits $n-2:0$ of said first and second partial products as those values would be added with mantissa overflow.

* * * * *

UNITED STATES PATENT AND TRADEMARK OFFICE
CERTIFICATE OF CORRECTION

PATENT NO. : 5,150,319
DATED : September 22, 1992
INVENTOR(S) : Zyner

It is certified that error appears in the above-indentified patent and that said Letters Patent is hereby corrected as shown below:

In the title page, column 2 of the Abstract at line 11, please delete " chose " and insert -- chosen --.

In column 3 at line 41, please delete "[05:52]" and insert -- {105:52} --.

In column 3 at line 59 and 65, column 4 at line 2, 8, 31, 38, 42, 48, and column 5 at line 9, and 15, please delete " $MAN_{13}$ " and insert -- $MAN\_$ --.

In column 5 at line 37, please delete " $S1_{13}$ " and insert -- $S1\_$ --.

In column 5 at line 59-60, please delete " RND MODE " and insert -- RND_MODE --.

In column 7, claim 1 at line 40, please delete " 2n+1:0 " and insert -- {2n+1:0}.

In column 7, claim 1 at line 41, please delete " n:0 " and insert -- {n:0} --.

In column 7, claim 1 at line 45, please delete " 2n+1:01 " and insert -- {2n+1:0} --.

In column 7, claim 1 at line 47, please delete " n+1:0 " and insert -- {n+1:0} --.

In column 7, claim 1 at line 48, please delete " 2n+1:n " and insert -- {2n+1:n} --.

In column 7, claim 1 at line 50, please delete " n-1 " and insert -- {n-1} --.

UNITED STATES PATENT AND TRADEMARK OFFICE
CERTIFICATE OF CORRECTION

PATENT NO. : 5,150,319
DATED : September 22, 1992
INVENTOR(S) : Zyner

It is certified that error appears in the above-indentified patent and that said Letters Patent is hereby corrected as shown below:

In column 7, claim 1 at line 52, please delete " of " and insert -- of said carry-in from --.

In column 7, claim 1 at line 52, please delete " n-1:0 " and insert -- $\{n-1:0\}$ --.

In column 7, claim 1 at line 54, please delete " n+1:2 " and insert -- $\{n+1:2\}$ --.

In column 7, claim 1 at line 55, please delete " 2N+a:n+2 " and insert -- $\{2n+1:n+2\}$ --.

In column 7, claim 1 at line 58, please delete " n+1 " and insert -- $\{n+1\}$ --.

In column 7, claim 1 at line 60, please delete " n+1:0 " and insert -- $\{n+1:0\}$ --.

In column 7, claim 1 at line 63, please delete "1:0 " and insert -- $\{1:0\}$ --.

In column 7, claim 1 at line 64, please delete " n-2:0 " and insert -- $\{n-2:0\}$ --.

In column 8, claim 1 at line 1, 4, 7, 10, and 11, please delete "1:0 " and insert -- $\{1:0\}$ --

In column 8, claim 1 at line 5, please delete " n-2:0 " and insert -- $\{n-2:0\}$ --.

In column 8, claim 1 at line 9, please delete " n+1:2 " and insert -- $\{n+1:2\}$ --.

In column 8, claim 1 at line 11, please delete " the " and insert -- said --.

In column 8, claim 2 at line 16, please delete " n+1:2 " and insert -- $\{n+1:2\}$ --.

UNITED STATES PATENT AND TRADEMARK OFFICE
CERTIFICATE OF CORRECTION

PATENT NO. : 5,150,319
DATED : September 22, 1992
INVENTOR(S) : Zyner

PAGE 3 OF 4

It is certified that error appears in the above-indentified patent and that said Letters Patent is hereby corrected as shown below:

In column 8, claim 2 at line 16 and 18, please delete " 1:0 " and insert -- {1:0} --.

In column 8, claim 2 at line 20, please delete " n+1 " and insert -- {n+1} --.

In column 8, claim 3 at line 25, plesae delete " n+1:2 " and insert -- {n+1:2} --.

In column 8, claim 3 at line 25 and 27, please delete " 1:0 " and insert -- {1:0} --.

In column 8, claim 3 at line 30, please delete " second " and insert -- second multiplexor means for providing said first and second --.

In column 8, claim 3 at line 30, please delete " 1:0 " and insert -- {1:0} --.

In column 8, claim 3 at line 31, please delete "said first and second set of bits 1:0 for the final mantissa. --.

In column 8, claim 4 at line 34, please delete " n+1:2 " and insert -- {n+1:2} --.

In column 8, claim 4 at line 34, please delete " 1:0 " and insert -- {1:0} --.

In column 8, claim 4 at line 38, please delete "bit" and insert -- bit {n+1} --.

In column 8, claim 5, at line 44, please delete "1:0" and insert --{1:0}--.

UNITED STATES PATENT AND TRADEMARK OFFICE
CERTIFICATE OF CORRECTION

PATENT NO. : 5,150,319
DATED : September 22, 1992
INVENTOR(S) : Zyner

It is certified that error appears in the above-indentified patent and that said Letters Patent is hereby corrected as shown below:

In column 8, claim 5 at line 45, please delete " n-2:0 " and insert -- {n-2:0} --.

In column 8, claim 5 at line 47, plese delete " 1:0 " and insert -- {1:0} --.

In column 8, claim 5 at line 50, please delete " n+1: n-1 " and insert -- {n+1:n-1} --.

In column 8, claim 5 at line 54, please delete " 1:0 " and insert -- {1:0} --.

In column 8, claim 5 at line 55, please delete " n-2:0 " and insert -- {n-2:0} --.

In column 8, claim 5 at line 60, please delete " n+1:n-1 " and insert -- {n+1:n-1} --.

In column 8, claim 5 at line 62, please delete " n-2:0 " and insert -- {n-2:0} --.

Signed and Sealed this

Eighth Day of July, 1997

*Attest:*

BRUCE LEHMAN

*Attesting Officer*   Commissioner of Patents and Trademarks